UNITED STATES PATENT OFFICE.

DIEDRICH MEINEN, OF WARRENTON, TEXAS, ASSIGNOR OF ONE-HALF TO JOHN C. SPRECKLES, OF SAME PLACE.

LINIMENT.

SPECIFICATION forming part of Letters Patent No. 442,667, dated December 16, 1890.

Application filed October 14, 1890. Serial No. 368,093. (No specimens.)

*To all whom it may concern:*

Be it known that I, DIEDRICH MEINEN, a citizen of the United States, residing at Warrenton, in the county of Fayette and State of Texas, have invented certain new and useful Improvements in Medicinal Compounds; and I do declare the following to be a full, clear, and exact description of the invention, such as will enable others skilled in the art to which it appertains to make and use the same.

This invention relates to improvements in that class of topical remedies which are compounded for the purpose of relieving rheumatism, neuralgia, gout, toothache, sprains, swellings, bruises, sores, and similar afflictions, and its curative properties are largely dependent on the use of the root and bark of the trumpet-flower plant, although each of the other ingredients is necessary to the effectiveness of the medicine.

To the above ends and such others as it may pertain, my invention consists in the use and compounding, in the manner hereinafter to be described, of the following ingredients, in or about their accompanying proportions, namely: bark and root of the trumpet creeper, (*Tecoma radicans juss*,) thirteen and one-half ounces; root of the pokeberry, (*Phytolacca*,) eight and one-half ounces; aqua ammonia, one liquid ounce, and spirits of turpentine, two and one-fourth liquid ounces. To these I add cotton-seed oil in sufficient quantity to make one quart of the medicine, the root and bark of the trumpet flower and the root of the pokeberry being boiled in the latter and the ammonia and turpentine being added on the cooling of the mixture.

My medicine may be applied in any suitable or usual manner of applying external remedies.

Having thus described my invention, what I claim as new, and desire to secure by Letters Patent, is—

The combination, in a topical remedy, of the bark and root of the trumpet creeper, (*Tecoma radicans*,) the root of the pokeberry, aqua-ammonia, and spirits of turpentine, compounded with cotton-seed oil in substantially the manner and proportions specified.

In testimony whereof I affix my signature in presence of two witnesses.

DIEDRICH MEINEN.

Witnesses:
R. H. SEYMOUR,
J. C. SPREKELS.